United States Patent
Aiso et al.

(10) Patent No.: US 6,463,201 B2
(45) Date of Patent: Oct. 8, 2002

(54) LIGHT AMPLIFICATION OPTICAL FIBER AND LIGHT AMPLIFIER USING THE SAME

(75) Inventors: Keiichi Aiso, Chiyoda-ku (JP); Yoshio Tashiro, Chiyoda-ku (JP); Takeshi Yagi, Chiyoda-ku (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/985,477

(22) Filed: Nov. 5, 2001

(65) Prior Publication Data

US 2002/0114600 A1 Aug. 22, 2002

Related U.S. Application Data

(63) Continuation of application No. PCT/JP01/05312, filed on Jun. 21, 2001.

(30) Foreign Application Priority Data

Jun. 23, 2000 (JP) .................................... 2000-189341

(51) Int. Cl.⁷ .......................... G02B 6/02; H04B 10/12; H01S 3/30

(52) U.S. Cl. ....................... 385/123; 385/141; 385/142; 385/144; 372/6; 359/341.1; 359/341.5

(58) Field of Search ................................ 385/123, 141, 385/142, 144, 145, 126; 372/6; 359/341.1, 341.5, 342

(56) References Cited

U.S. PATENT DOCUMENTS

| | | | |
|---|---|---|---|
| 4,780,877 A | * 10/1988 | Snitzer ........................... 372/6 |
| 4,923,279 A | 5/1990 | Ainslie et al. ............... 359/341 |
| 5,005,175 A | * 4/1991 | Desurvire et al. ........ 359/341.3 |
| 5,027,079 A | * 6/1991 | Desurvire et al. ........ 359/341.1 |
| 5,225,925 A | 7/1993 | Grubb et al. ............... 359/341 |
| 5,278,850 A | * 1/1994 | Ainslie et al. .................. 372/6 |
| 5,412,672 A | * 5/1995 | Ainslie et al. ............... 359/343 |
| 5,491,581 A | * 2/1996 | Roba ........................ 359/337.3 |
| 5,526,459 A | * 6/1996 | Tanaka et al. ............... 385/123 |
| 5,748,364 A | 5/1998 | Meli et al. ................... 359/341 |
| 6,043,930 A | 3/2000 | Inagaki ........................ 359/341 |
| 6,055,353 A | 4/2000 | Aiso .......................... 385/123 |

FOREIGN PATENT DOCUMENTS

| | | | |
|---|---|---|---|
| JP | 03-265537 | 11/1991 | ............. 385/123 X |
| JP | 04-154641 | 5/1992 | ............. 385/123 X |
| JP | 05-270857 | 10/1993 | ............. 385/123 X |

(List continued on next page.)

OTHER PUBLICATIONS

J. Nilsson, et al., IEEE Photonics Technology Letters, vol. 6, No. 3, pp. 383–385, "Modeling and Optimization of Short $Yb^{2+}$–Sensitized $Er^{3+}$–Doped Fiber Amplifiers", Mar. 1994.
M. Yoshida, et al., No. 84, pp. 41–48, "$Er^{3+}$–Doped Fiber Optical Amplifier" Oct. 20, 1992 (with English Summary).
K. Aiso, et al., 2000 nen Denshi Joho Tsushin Gakkai Electronics Soceity Taikai Kouen Ronbunshuu 1, Shadan Houjin Denshi Joho Tsuushin Gakkai, p. 216, "High Power Low Non–Linearity Erbium Ytterbium Co–Doped Fiber Amplifier Pumped at 1480NM", Sep. 7, 2000.
K. Aiso, et al., Furukawa Denko Jiho, No. 107, pp. 35–39, Development of Er, Yb Co–Doped Fiber for High Power Optical Amplifier, Jan. 10, 2001.

*Primary Examiner*—Brian Healy
(74) *Attorney, Agent, or Firm*—Oblon, Spivak, McClelland, Maier & Neustadt, P.C.

(57) ABSTRACT

A light amplification optical fiber capable of suppressing a decrease in an amplification efficiency thereof ascribed to the concentration quenching of erbium ions, and the non-linearity thereof is provided. At least one rare earth element, for example, Yb, which is other than the erbium ions, and which has an ion radius not smaller than 70% and not larger than 130% of that of erbium ions is doped to a core portion of an erbium ion-doped light amplification optical fiber.

15 Claims, 2 Drawing Sheets

FOREIGN PATENT DOCUMENTS

| | | | |
|---|---|---|---|
| JP | 07-069667 | 3/1995 | ............. 385/123 X |
| JP | 8-46592 | 2/1996 | ............. 385/123 X |
| JP | 08-222784 | 8/1996 | ............. 385/123 X |
| JP | 09-211511 | 8/1997 | ............. 385/123 X |
| JP | 10-242556 | 9/1998 | ............. 385/123 X |
| JP | 10-261826 | 9/1998 | ............. 385/123 X |
| JP | 10-319266 | 12/1998 | ............. 385/123 X |
| JP | 11-011976 | 1/1999 | ............. 385/123 X |
| JP | 11-084159 | 3/1999 | ............. 385/123 X |

\* cited by examiner

LIGHT AMPLIFICATION OPTICAL FIBER AND LIGHT AMPLIFIER USING THE SAME

BACKGROUND OF THE INVENTION

1. Technical Field

This invention relates to a light amplification optical fiber utilized mainly for an optical communication system; and a light amplifier using the optical fiber.

2. Background Art

In recent years, a demand for communication by internet, etc. has suddenly increased, and an increase in the transmission capacity of an optical transmission passage is being actively discussed. In accordance with these facts, an increase in the capacity of a wavelength division multiplexing (WDM) optical transmission system, i.e. an increase in the number of channels and the expansion of a transmission band are progressing. In order to attain an increase in the capacity of a WDM optical transmission system, it is indispensable to increase the level of an output from a signal light amplifying light amplifier and attain the expansion of a transmission band, and a light amplifier as an important key device has increasingly attracted the technicians' attention.

With an increase in the number of channels for a WDM signal, total signal light input power increases, and higher saturation power has been demanded with respect to a light amplifier which is adapted to collectively increase the number of channels and signal light input power. Under the circumstances, the increasing of a light amplifier output has been forwarded by increasing the efficiency of a light amplification optical fiber and a pumping source output.

The discussing of the expansion of a gain band for a light amplifier is also being forwarded so as to expand a transmission band, and a light amplifier having a gain band of a wavelength larger than that a gain band in a related art light amplifier has been attained in practice by using an elongated light amplification optical fiber.

However, the above-mentioned increase in an output from and the length of a light amplification optical fiber has caused a new problem to arise, i.e., nonlinear phenomena which had not been observed in a related art light amplification optical fiber have occurred. The main nonlinear phenomena include four-wave mixing and cross phase modulation. Since the transmission quality of signal light is deteriorated due to these nonlinear effects, the suppression of the occurrence of nonlinearity has become necessary and indispensable.

The waveform distortion due to nonlinear phenomena can be estimated by the following equation (1).

$$\Phi_{NL}=(2\pi/\lambda)\cdot(n_2/A_{\mathit{eff}})L_{\mathit{eff}}P \qquad (1)$$

In this equation (1), $L_{\mathit{eff}}$ represents an effective length of an amplification optical fiber, $A_{\mathit{eff}}$ an effective core area $n_2$ a nonlinear refractive index, $\lambda$ a signal light wavelength, and P input light intensity.

It is understood from the equation (1) that, in order to suppress the occurrence of waveform distortion $\Phi_{NL}$, it is preferable to (1) reduce the effective length of a fiber, and (2) minimize a nonlinear constant $(n_2/A_{\mathit{eff}})$.

In order to reduce a length of a fiber used, it is necessary to heighten a gain coefficient per unit length by increasing an amount of addition of a rare earth element. However, when the concentration of erbium is increased in an erbium-doped optical fiber, which is being put to practical use as a light amplifier for 1.55 $\mu$m band, a decrease in the amplification efficiency due to concentration quenching occurs.

In general, the concentration of erbium at which concentration quenching starts occurring is several hundred wtppm in the case of a pure quartz $(SiO_2)$ host, and it is said to be around 1000 wtppm even in the case of $Al_2O_{3-SiO_2}$ host to which aluminum having a concentration quenching suppressing effect is co-doped (refer to, for example, R.I.LAMING, D.N.PAYNE, F.MELI, G.GRASSO, E.J.TARBOX, "SATURATED ERBIUM-DOPED FIBRE AMPLIFIERS", OAA '90.Tech.Digest MB3.). Therefore, there is a limit to the reduction of the length of an erbium-doped optical fiber.

The increasing of an effective core area $A_{\mathit{eff}}$ may be mentioned as another nonlinearity suppressing method. In general, an effective area of an erbium-doped optical fiber has a value one digit smaller than that of a regular single-mode optical fiber (SMF). The reason for the above is to form excellent inverted population over the whole of a core by increasing a relative refractive index difference $\Delta$ of a core portion with respect to a clad portion, and thereby heightening the pumping light density so as to improve the gain characteristics of the erbium-doped optical fiber with a high efficiency.

Furthermore, a light amplification optical fiber contains various kinds of large amounts of dopants in a core portion thereof as compared with a regular transmission optical fiber, and this makes it more difficult to control an effective core area.

A light amplification fiber contains many elements, for example, an element for improving the solubility of a rare earth element for melting the rare earth element in host glass, an element for increasing a refractive index of host glass, an element for varying gain wavelength characteristics thereof, an element for improving the amplification characteristics thereof, an element doped to regulate the viscosity thereof and the like besides rare earth elements constituting active substances. These elements, which are other than the rare earth elements, doped to a core portion are called co-dopants.

The addition concentration of these co-dopants is determined from the viewpoint of the optimization of the amplification characteristics of the light amplifier. Conjointly with the diversity of the co-dopants, the above matter makes it very difficult to control the refractive index.

The germanium has heretofore been used as a co-dopant for improving the refractive index of a core portion.

The germanium is effective not only in improving the refractive index but also in regulating the viscosity of a core portion. Such co-dopants as are mentioned above which are doped to a core portion of a light amplification optical fiber are all substances for improving the refractive index just as the germanium.

However, since the relative refractive index difference $\Delta$ becomes high due to the addition of the co-dopants, it is difficult to suppress the nonlinearity of a light amplification optical fiber. It is necessary as previously mentioned to reduce the using length, i.e. effective length of a light amplification optical fiber for the purpose of suppressing the nonlinearity thereof. However, in order to meet this requirement, it is necessary to improve the gain coefficient per unit length. Therefore, the addition amounts of a rare earth element and a co-dopant have to be increased, and this causes the relative refractive index difference $\Delta$ to further increase.

In view of these problems, a method of improving a limit level of addition concentration of erbium, and a new method of attaining a desired effective core area $A_{\mathit{eff}}$ without depending upon the addition concentration of co-dopants, such as a rare earth element, etc. for practically obtaining a nonlinear phenomena-suppressed amplification optical fiber have been demanded.

SUMMARY OF THE INVENTION

The present invention has been made in view of the above-mentioned circumstances, and provides a nonlinear phenomena-suppressed light amplification optical fiber, and an optical amplifier using the fiber.

DISCLOSURE OF THE INVENTION

According to an aspect of the present invention, the light amplification optical fiber has the following construction, i.e. this optical fiber has a core portion, and not less than one layer of clad portion surrounding an outer circumference of the core portion, erbium ions being doped to the core portion, at least one kind of rare earth element ions which are other than the erbium ions, and which have ion radius of not lower than 70% and not higher than 130% of that of the erbium ions, being further doped to the core portion.

According to another aspect of the present invention, the light amplification optical fiber has aluminum doped to the core portion, the number of the ions of the aluminum doped to the core portion being not less than 6 times as large as a total ion number of the rare earth element contained in the core portion.

According to still another aspect of the present invention, the light amplification optical fiber has phosphorus doped to the core portion.

According to a further aspect of the present invention, the light amplification optical fiber has a substance reducing a refractive index of pure quartz, this substance being doped to the core portion, the substance reducing the refractive index of pure quartz being, for example, fluorine.

According to another aspect of the present invention, the light amplification optical fiber has germanium doped to the core portion in some cases, or does not substantially have germanium in the core portion in some cases.

According to still another aspect of the present invention, the light amplification optical fiber has in at least a part of the clad portion a substance increasing a refractive index of pure quartz, this substance which increases a refractive index of pure quartz being at least one of, for example, germanium, phosphorus and aluminum.

According to a further aspect of the present invention, the light amplification optical fiber has a concentration of the erbium doped to the core portion of as high as over 1000 wtppm, the concentration being allowed to reach as high as 2000 wtppm level.

According to another aspect of the present invention, the light amplification optical fiber has a rare earth element, which is other than erbium, doped to the core portion, the rare earth element being an element selected from the group of La, Ce, Pr, Nd, Sm, Eu, Gd, Tb, Dy, Ho, Tm, Yb and Lu.

According to still another aspect of the present invention, the light amplification optical fiber has an example of refractive index distribution constitution thereof, in which a relative refractive index difference of the core portion with respect to the clad layer on the immediately outer side of the core portion is smaller than 1.0%.

According to a further aspect of the present invention, the light amplifier has the above-mentioned light amplification optical fibers used as light amplification optical fibers.

According to the present invention described above, the increasing of the concentration of erbium to a high level can be attained without causing a decrease in the efficiency ascribed to concentration quenching to occur, and the length of a fiber in use can be reduced. The reason for the above resides in that ions of a rare earth element, which is other than erbium, co-doped surround those of erbium to cause the distances among the erbium ions to increase, and the interaction of the erbium ions to be suppressed.

The addition of a substance reducing the refractive index of the core portion and the non-addition of germanium thereto enable a light amplification optical fiber in which a nonlinearity constant is further reduced to be obtained in practice. The reason for the above resides in that the degree of freedom of regulating a refractive index difference between the core and clad increases not depending upon the kind and concentration of dopants, such as a rare earth element, aluminum, phosphorus, etc., this enabling the effective core area ($A_{\mathit{eff}}$) to be increased arbitrarily, and the nonlinearity constant ($n_2/A_{\mathit{eff}}$) to be increased in consequence.

The amount of waveform distortion due to nonlinear phenomena is proportional to a product of an effective length $L_{\mathit{eff}}$ and a nonlinearity constant ($n_2/A_{\mathit{eff}}$). According to the present invention, the effective length and nonlinearity constant can be reduced respectively. As a result, the occurrence of nonlinear phenomena in the light amplification optical fiber can be suppressed, and a light amplifier free from the deterioration of the transmission quality of an optical signal can be obtained in practice.

BEST MODE FOR CARRYING OUT THE INVENTION

Figure 1:
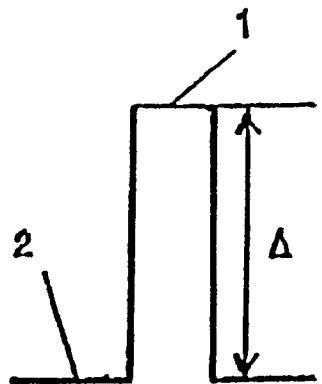
FIG. 1 illustrates the refractive index distribution constitution of an embodiment of the light amplification optical fiber according to the present invention.

The present invention will now be described more in detail in accordance with the attached drawings. FIG. 1 shows the refractive index distribution constitution of an embodiment of the light amplification optical fiber according to the present invention. Referring to FIG. 1, a reference numeral 1 denotes a core portion, and 2 a clad portion, and a reference symbol Δ a relative refractive index difference of the core portion with respect to the clad portion 2. The outer circumference of the core portion 1 of a high refractive index is surrounded by the clad portion 2 of a low refractive index, and the level of the refractive index of the clad portion 2 in the example of FIG. 1 agrees with that of silica.

In the light amplification optical fiber of this embodiment of the present invention, erbium is doped to the core portion 1, and rare earth elements other than erbium are co-doped thereto. To be exact, the first embodiment of the present invention is formed of an erbium-ytterbium-doped optical fiber obtained by co-doping ytterbium (Yb) besides erbium (Er) to the core portion 1 of the light amplification optical fiber.

A second embodiment of the present invention is directed to an erbium-lanthanum-doped optical fiber obtained by co-doping lanthanum (La) besides erbium (Er) to a core portion of a light amplification optical fiber.

Figure 6:
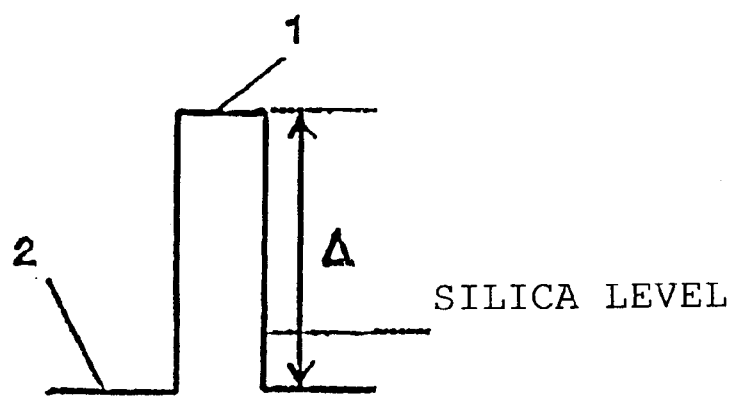
FIG. 6 illustrates an example of the refractive index distribution constitution of a related art light amplification optical fiber.

In a related art example of a light amplification optical fiber shown in FIG. 6, the level of a relative refractive index difference $\Delta$ of a core portion 1 with respect to a clad portion 2 is lower than that of the refractive index of silica.

Namely, in the related art light amplification optical fiber, a relative refractive index difference $\Delta$ is increased by adding germanium as a dopant for increasing a refractive index to a core portion 1 of an erbium-doped optical fiber (EDF), and fluorine for decreasing a refractive index to a clad portion 2. These techniques are used so as to heighten the pumping light density, and thereby attain an excellent pumping efficiency but consideration is not given to the suppression of nonlinear phenomena.

The parameters of the first and second embodiments of the light amplification optical fiber according to the present invention and those of the light amplification optical fibers of the related art examples 1 and 2 as comparative examples will be shown on Table 1. Table 1 further shows the results of comparison between optimum lengths of these optical fibers with respect to erbium concentration and pumping light intensity and the energy conversion efficiency at the corresponding time. The data shown on Table 1 are values obtained when a pumping light wavelength and a signal light wavelength are set to 1480 nm and 1560 nm respectively.

fibers of a small length of the embodiments 1 and 2, a high energy conversion efficiency is displayed with a high erbium concentration, i.e., the effect of the present invention was ascertained.

From the above results, it was ascertained that the ytterbium and lanthanum have an erbium concentration quenching suppressing effect. It is known that, even when aluminum or phosphorus is doped to a core portion, a certain degree of concentration quenching suppressing effect is obtained. However, when the concentration of doped erbium exceeds 1000 wtppm, concentration quenching necessarily occurs. This is clear from the results as well of the energy efficiency measurement in the related art example 1.

In the embodiments 1 and 2 of the present invention, in which ytterbium or lanthanum was co-doped to the core portion 1, it was ascertained that a noticeable decrease in efficiency due to concentration quenching did not occur even when the concentration of erbium exceeded 2000 wtppm.

The reason for the above is that plural ytterbium ions or lanthanum ions co-doped surround the erbium ions to form clusters, so that the distances among the erbium ions increase to cause the interactions of the erbium ions to be suppressed. The shapes of the respective ions and arrangement of electrons have delicate relation to the degree of the occurrence of clustering between different kinds of ions.

Accordingly, substances having electron arrangement identical with that of erbium and an ion radius substantially equal to that of erbium ions, the substances attain an erbium ion interaction suppressing effect identical with those of the

TABLE 1

| TYPE | EMBODIMENT 1 | EMBODIMENT 2 | RELATED ART EXAMPLE 1 | RELATED ART EXAMPLE 2 |
|---|---|---|---|---|
| COMPOSITION OF CORE | Er/Yb/P/Al/Ge/Si | Er/La/Al/Ge/Si | Er/Al/Ge/Si | Er/Al/Ge/Si |
| COMPOSITION OF CLAD | $SiO_2$ | $SiO_2$ | F—$SiO_2$ | F—$SiO_2$ |
| CONCENTRATION OF Er (wt ppm) | 2000 | 2120 | 1000 | 380 |
| CONCENTRATION OF Al (wt %) | 3.8 | 3.2 | 3.0 | 1.1 |
| CONCENTRATION OF Yb (wt ppm) | 2.5 | 0 | 0 | 0 |
| CONCENTRATION OF La (wt ppm) | 0 | 2.0 | 0 | 0 |
| RELATIVE REFRACTIVE INDEX DIFFERENCE $\Delta$ | 0.9 | 0.8 | 1.3 | 1.3 |
| LENGTH (m) | 7 | 7 | 12 | 50 |
| ENERGY EFFICIENCY (%) | 76 | 75 | 63 | 86 |

As is clear from Table 1, when ytterbium or lanthanum is doped to the core portions of the light amplification optical ytterbium and lanthanum. Such substances will be shown on Table 2.

TABLE 2

| ATOMIC NUMBER | ATOMIC SYMBOL | ATOMIC WEIGHT | ELECTRON CONFIGURATION | OXIDATION NUMBER | ION RADIUS A (6 COORDINATION) |
|---|---|---|---|---|---|
| 57 | La | 138.90552 | [Xe],5d1,6s2 | +3, | 1.20 |
| 58 | Ce | 140.1154 | [Xe],4f1,5d1,6s2, | +3,+4, | 1.17 |
| 59 | Pr | 140.907653 | [Xe],4f3,6s2, | +3,+4, | 1.15 |
| 60 | Nd | 144.243 | [Xe],4f4,6s2, | +3, | 1.14 |

TABLE 2-continued

| ATOMIC NUMBER | ATOMIC SYMBOL | ATOMIC WEIGHT | ELECTRON CONFIGURATION | OXIDATION NUMBER | ION RADIUS A (6 COORDINATION) |
|---|---|---|---|---|---|
| 62 | Sm | 150.363 | [Xe],4f6,6s2, | +3, | 1.10 |
| 63 | Eu | 151.9659 | [Xe],4f7,6s2, | +2,+3, | 1.31 |
| 64 | Gd | 157.253 | [Xe],4f7,5d1,6s2, | +3, | 1.08 |
| 65 | Tb | 158.925343 | [Xe],4f9,6s2, | +3,+4 | 1.06 |
| 66 | Dy | 162.503 | [Xe],4f10,6s2, | +3, | 1.05 |
| 67 | Ho | 164.930323 | [Xe],4f11,6s2, | +3, | 1.03 |
| 68 | Er | 167.263 | [Xe],4f12,6s2, | +3, | 1.02 |
| 69 | Tm | 168.934213 | [Xe],4f13,6s2, | +3, | 1.01 |
| 70 | Yb | 173.043 | [Xe],4f14,6s2, | +2,+3, | 1.00 |
| 71 | Lu | 174.9671 | [Xe],4f14,5d1,6s2, | +3, | 0.99 |

The rare earth elements shown on Table 2 have electronic configuration identical with that of erbium ions, and, moreover, ion radii which are not smaller than 70% and not larger than 130% of that of erbium ions. These elements are different in the number of 4f-shell electrons. However, the 4f-shell electrons are covered with eight electrons including 5s2 and 5p6 electrons, so that the chemical properties of these elements are very similar to each other.

In view of the facts, these elements can also attain an erbium ion interaction suppressing effect identical with those of ytterbium and lanthanum. The values of erbium are also shown on this table for comparison sake. The chlorides of all of these elements exist stably, and these elements are rare earth elements capable of being doped in practice to a core of an optical fiber.

In the embodiments 1 and 2, aluminum is doped for the purpose of improving the solubility of a rare earth element. A rare earth element originally has a low solubility with respect to silica host. Therefore, when a large quantity of rare earth element is doped as in the present invention, an increase in a transmission loss occurs due to the devitrification of a core which is ascribed to the clustering of the rare earth element. Adding aluminum is effective for suppressing this unfavorable phenomenon.

However, aluminum is a substance for increasing the refractive index of pure quartz. When aluminum is doped to the core portion 1, the effective core area thereof decreases. Therefore, in view of the suppression of nonlinear phenomena, restricting the amount of addition of aluminum to a minimum level is preferable.

Under the circumstances, samples were made by varying a ratio of a total amount of addition of rare earth elements to an amount of addition of aluminum, to examine the occurrence or non-occurrence of clustering. As a result, it was ascertained that, when the number of aluminum ions doped was not less than 6 times that of a total number of ions of rare earth elements doped to the core portion 1, the devitrification of the core did not occur. It was also ascertained that adding phosphorus to the core portion 1 was also effective in suppressing the clustering of rare earth elements.

An embodiment 3 of the present invention will now be described. In this embodiment 3, fluorine is further doped to a core portion 1 of an erbium-ytterbium-doped optical fiber obtained by co-doping ytterbium to the core portion 1. Germanium is not doped to the core portion 1.

Namely, in the embodiment 3, an excessive increase in the refractive index of the core portion 1 which is ascribed to germanium is suppressed, and, moreover, the refractive index of the core portion 1 is reduced by adding fluorine. The items of the erbium-ytterbium co-doped optical fiber in the embodiment 3 will be shown on Table 3.

TABLE 3

| COMPOSITION OF CORE | Er/Yb/P/Al/F/Si |
|---|---|
| COMPOSITION OF CLAD | $SiO_2$ |
| RELATIVE REFRACTIVE INDEX DIFFERENCE Δ | 0.36% |
| CONCENTRATION OF Er | 2000 wtppm |
| CONCENTRATION OF Yb | 2.5 wt % |
| CONCENTRATION OF Al | 3.8 wt % |

In order to estimate the amounts of waveform distortion due to nonlinear phenomena in the light amplication optical fibers of the embodiments 1 and 3 and related art example 2, the effective core areas $A_{eff}$ with respect to a wavelength of 1550 nm were measured. The results will be shown on Table 4.

TABLE 4

| TYPE | EMBODIMENT 1 | EMBODIMENT 3 | RELATED ART EXAMPLE 2 |
|---|---|---|---|
| COMPOSITION OF CORE | Er/Yb/P/Al/Ge/Si | Er/Yb/P/Al/F/Si | Er/Al/Ge/Si |
| COMPOSITION OF CLAD | $SiO_2$ | $SiO_2$ | F—$SiO_2$ |
| RELATIVE REFRACTIVE INDEX DIFFERENCE (%) | 0.9 | 0.36 | 1.3 |
| CONCENTRATION (wtppm) OF Er IONS | 2000 | 2000 | 1000 |
| CONCENTRATION (wtppm) OF Al IONS | 3.8 | 3.8 | 3 |
| CONCENTRATION (wtppm) OF Yb IONS | 2.5 | 2.5 | 0 |
| Aeff($\mu m^2$) @λ = 1550 nm | 40 | 74 | 23 |

From these results, the following effects of the present invention were ascertained. Namely, it becomes possible to increase the effective core area greatly, obtain a high energy conversion efficiency with a high erbium concentration even when an optical fiber of a small length is used, and reduce waveform distortion ascribed to the nonlinearity of the fiber.

As previously described, it became clear in the optical fiber of the embodiment 1 that the adding of ytterbium enabled an optical fiber of a high erbium concentration to be obtained, and that even an optical fiber of a small length enabled a high energy conversion efficiency to be displayed. In the embodiment 3, an equally high conversion efficiency was also obtained by an optical fiber of a substantially equal length.

Namely, adding fluorine to a core as in the embodiment 3 enabled the effective core area to be increased, and a waveform distortion ascribed to the nonlinearity of the optical fiber to be further reduced as compared with that in the embodiment 1. The reason resides in that the amount of waveform distortion ascribed to nonlinear phenomena is proportional to ($L_{eff}/A_{eff}$).

In the embodiment 3, the effective core area was increased by adding fluorine to the core portion 1, and by not adding germanium thereto. The effective core area is also increased in the same manner even when a dopant increasing a refractive index is doped to at least a part of the clad portion 2. The dopant increasing the refractive index and used in this case is preferably at least one of germanium, phosphorus and aluminum in view of their capability of not spoiling various properties of the optical fiber.

The refractive index distribution constitution of the light amplification optical fiber according to the present invention is not limited to a simple stepped type of FIG. 1. For example, the core portion 1 may be set to have an alpha profile.

Figure 2:
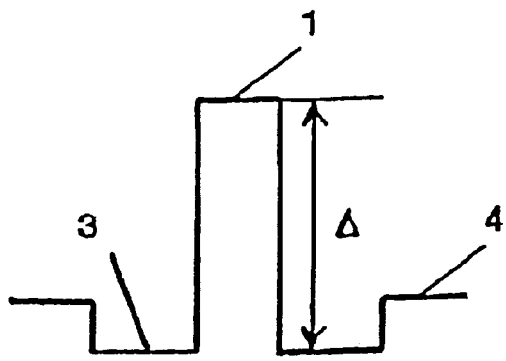
FIG. 2 illustrates another example of the refractive index distribution constitution of the light amplification optical fiber according to the present invention.
Figure 3:
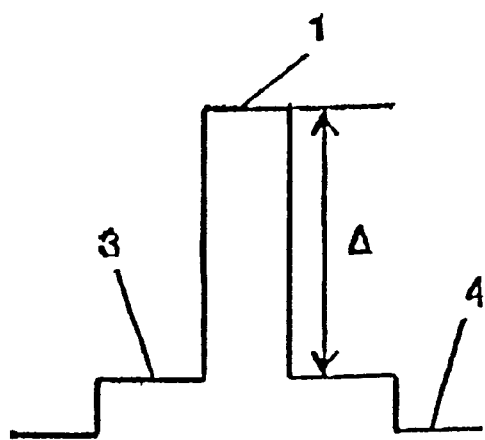
FIG. 3 illustrates still another example of the refractive index distribution constitution of the light amplification optical fiber according to the present invention.

As shown in FIG. 2 and FIG. 3, the optical fiber may have a double (2-layer) clad type refractive index distribution constitution formed of from the inner side a core portion 1, a first clad portion 3 and a second clad portion 4. In this case, a relative refractive index difference Δ is determined by the core portion 1 and the first clad portion 3 which is on the immediately outer side of the core portion 1.

Figure 4:
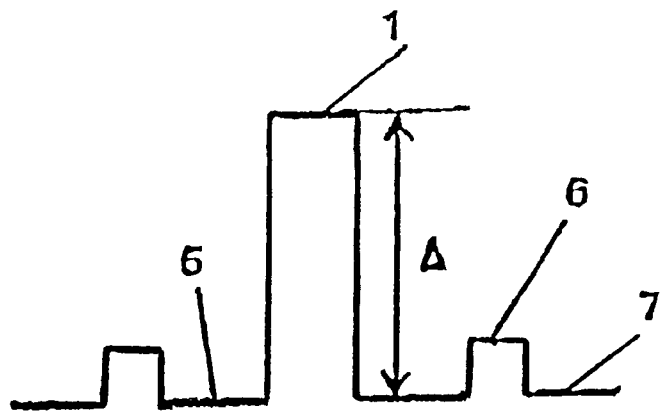
FIG. 4 illustrates a further example of the refractive index distribution constitution of the light amplification optical fiber according to the present invention.
Figure 5:
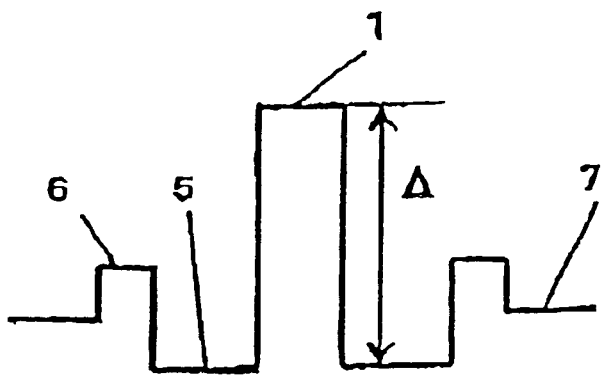
FIG. 5 illustrates another example of the refractive index distribution constitution of the light amplification optical fiber according to the present invention.

As shown in FIG. 4 and FIG. 5, the optical fiber may have a triple (three-layer) clad type refractive index distribution constitution formed of from the inner side a core portion 1, a first clad portion 5, a second clad portion 6 and a third clad portion 7. In this case, a relative refractive index difference Δ is determined by the core portion 1 and first clad portion 5.

The refractive index distribution constitution is not limited to those shown in FIG. 1 to FIG. 5. It is a matter of course that the optical fiber may have other refractive index distribution constitution.

Although, in the above-described embodiments, the concentration of the erbium doped to the core portion 1 is set to 2000 wtppm level, it may be at a level exceeding 1000 wtppm. When the erbium concentration in a related art light amplification optical fiber reaches a level in excess of 1000 wtppm, concentration quenching occurs even though aluminum or phosphorus is doped to the core portion thereof. In the structure according to the present invention, such a problem does not arise, and excellent effect which could not be obtained by a related art optical fiber can be displayed.

An embodiment of the light amplifier according to the present invention will now be described. The light amplifier in this embodiment is a fiber type light amplifier provided with a light amplification-optical fiber on an optical path which an optical signal passes, in which the light amplification optical fiber of each embodiment of the present invention is used as the mentioned light amplification optical fiber. Accordingly, the light amplifier of this embodiment displays in the same manner the excellent effect of the light amplification optical fiber of each of the above embodiments. Industrial Applicability:

As described above, the light amplification optical fiber and light amplifier according to the present invention are suitable to be used for the amplification of an optical signal in which the high-output and high-efficiency signal amplification is carried out in optical communication, etc. as nonlinear phenomena are suppressed.

What is claimed is:

1. A light amplification optical fiber having a core portion, and not less than one layer of clad portion surrounding an outer circumference of the core portion, erbium ions being doped to the core portion, comprising at least: one kind of rare earth element ions further doped to the core portion which are other than the erbium ions, and which have ion radius of not lower than 70% and not higher than 130% of that of the erbium ions.

2. A light amplification optical fiber according to claim 1, wherein aluminum is doped to the core portion.

3. A light amplification optical fiber according to claim 2, wherein the number of ions of the aluminum doped to the core portion is not less than 6 times as large as a total ion number of the rare earth element contained in the core portion.

4. A light amplification optical fiber according to claim 1, wherein phosphorus is doped to the core portion.

5. A light amplification optical fiber according to claim 1, wherein a substance reducing a refractive index of pure quartz is doped to the core portion.

6. A light amplification optical fiber according to claim 5, wherein the substance reducing a refractive index. of pure quarts is fluorine.

7. A light amplification optical fiber according to claim 1, wherein germanium is doped to the core portion.

8. A light amplification optical fiber according to claim 1, wherein germanium is not substantially doped to the core portion.

9. A light amplification optical fiber according to claim 1, wherein a substance increasing a refractive index of pure quartz is doped to at least a part of the clad portion.

10. A light amplification optical fiber according to claim 9, wherein the substance increasing a refractive index of pure quartz is at least one of germanium, phosphorus and aluminum.

11. A light amplification optical fiber according to claim 1, wherein the concentration of the erbium doped to the core portion is set to as high as over 1000 wtppm.

12. A light amplification optical fiber according to claim 11, wherein the concentration of the erbium doped to the core portion is set to as high as 2000 wtppm level.

13. A light amplification optical fiber according to claim 1, wherein the rare earth element, which is other than erbium, doped to the core portion is an element selected from the group of La, Ce, Pr, Nd, Sm, Eu, Gd, Tb, Dy, Ho, Tm, Yb and Lu.

14. A light amplification optical fiber according to claim 1, wherein a relative refractive index difference of the core portion with respect to the clad layer on the immediately outer side of the core portion is smaller than 1.0%.

15. A light amplifier having a light amplification optical fiber adapted to amplify an optical signal, comprising the light amplification optical fiber, which is defined in any one of claims 1–14, as the light amplification optical fiber.

* * * * *